United States Patent [19]

Bravet et al.

[11] Patent Number: 4,675,237
[45] Date of Patent: Jun. 23, 1987

[54] ADHESIVE LAYER USED IN THE MANUFACTURE OF LAMINATED GLASS AND LAMINATED GLASSES COMPRISING SUCH A LAYER

[75] Inventors: Jean-Louis Bravet, Thourotte; Gerard Daude, Villeneuve D'Ornon, both of France

[73] Assignee: Saint-Gobain Recherche, Aubervilliers, France

[21] Appl. No.: 845,621

[22] Filed: Mar. 28, 1986

[30] Foreign Application Priority Data

Mar. 28, 1985 [FR] France .............................. 85 04646

[51] Int. Cl.[4] ............................................. B32B 27/00
[52] U.S. Cl. .............................. 428/425.6; 428/423.1; 525/415; 525/440; 525/462; 525/130; 525/920; 528/75; 528/49
[58] Field of Search ........................... 428/425.6, 423.1; 525/415, 920, 440, 462, 130; 528/75, 49

[56] References Cited

U.S. PATENT DOCUMENTS

| | | | |
|---|---|---|---|
| 3,580,796 | 5/1971 | Hicke et al. | 428/38 |
| 4,198,200 | 4/1980 | Fonda et al. | 428/425.6 |
| 4,233,425 | 11/1980 | Tefertiller et al. | 525/455 |
| 4,241,140 | 12/1980 | Ammons | 428/425.6 |
| 4,268,554 | 5/1981 | Gras | 428/425.6 |

FOREIGN PATENT DOCUMENTS 199649 12/1982 Japan ................................ 428/425.6

*Primary Examiner*—Edith Buffalow
*Attorney, Agent, or Firm*—Oblon, Fisher, Spivak, McClelland & Maier

[57] ABSTRACT

An adhesive layer used in the manufacture of laminated glasses. The layer comprises a cold polymerizable polyurethane formed from an isocyanate component comprising a monoisocyanate with a double ethylene bond and from a polyol component and at least one polymerization initiator.

9 Claims, No Drawings

ADHESIVE LAYER USED IN THE MANUFACTURE OF LAMINATED GLASS AND LAMINATED GLASSES COMPRISING SUCH A LAYER

BACKGROUND OF THE INVENTION

1. Field of the Invention

The present invention relates to the manufacture of laminated glasses of glass and/or plastic such as laminated glasses in large sizes, e.g., glasses for automobiles and buildings, and in smaller sizes, such as masks, screens, eyeglasses, etc... More specifically, the invention relates to a new adhesive layer used in the manufacture of such laminated glasses. It further relates to laminated glasses comprising said adhesive layer.

2. Background of the Prior Art

The use of a polyurethane layer as an adhesive layer in laminated glasses is well known and is decribed in numerous patent publications. This layer can provide the sole function of adhesion. It can also have a role as an energy absorber.

This adhesive layer can be used to assemble sheets of various glass and/or plastic substances.

For example, French Patent Publication No. 2,398,606 describes the use of a thermoplastic polyurethane layer for the adhesion, with a glass or plastic support, of a self-repairing plastic layer, that is a layer from which local impressions disappear spontaneously after a short period of time, on the order of a few minutes, said speed of disappearance being a function of the type of impression and the temperature of the plastic. At the same time, this layer can be non-lacerating, that is that in the case of breakage of a glass pane, the layer covers the sharp edges of the glass and protects the faces, eyes or other parts of the body of passengers in a vehicle, for example, or further in the case of safety eyeglasses, the protective layer can prevent the sharp edges contacting the eyes.

The assembly of the self-repairing and non-lacerating plastic layer with the support by means of the thermoplastic layer is carried out by means of heat and pressure, for example by subjecting the laminate to an autoclave cycle.

European Patent Publication No. 0,032,329 describes the use of a thermoplastic polyurethane-based adhesive layer containing a blocking agent. Here again, when this layer is used to manufacture laminated glasses, particularly to join the self-repairing, non-lacerating plastic layer to a rigid support, heat and pressure must be used, for example by subjecting the assembly to an autoclave cycle at a temperature greater than 110° C.

In addition, in this prior art, the manufacture of the adhesive layer necessitates the use of heat for the polymerization of the polyurethane.

SUMMARY OF THE INVENTION

The invention proposed an adhesive layer formed from a cold-polymerizable adhesive composition, that is one which is polymerizable at a temperature generally below 80° C. The adhesive layer in accordance with the invention comprises a polyurethane formed from an isocyanate component comprising at least one monoisocyanate with a double ethylene bond in its formula, a polyol component comprising at least one polyol selected among the polyetherpolyols or the polyesterpolyols with a molecular weight of between 450 and 2000, the polycaprolactones with a molecular weight of between 500 and 2000, polycarbonatepolyols and polyestercarbonatepolyols with a molecular weight of between 1000 and 2000, polybutadienes with a hydroxyl or carboxyl function, and/or at least one short diol with a molecular weight of between 50 and 200, and/or at least one reticulating agent with a functionality greater than 2, such as a triol with a molecular weight of between 100 and 2000, and at least one polymerization initiator.

As the monoisocyanate with a double ethylene bond, α,α-metaisopropenyl dimethylbenzylisocyanate (m. TMI) or isocyanato-ethylmethacrylate (I.E.M.) is preferably used.

In addition to the monoisocyanate, the isocyanate component can, as necessary, comprise other isocyanates and in particular difunctional, aliphatic or cycloaliphatic isocyanates, such as 1,6-hexanediisocyanate, 2,2,4-trimethyl-1,6-hexanaediisocynate, 2,4,4-trimethyl-1,6-hexanediisocyante, 1,3-bis-(isocyanato-methyl)-benzene, bis-(4-isocyanatocyclohexyl)-methane, bis-(3-methyl-4-isocyanatocyclohexyl)-methane, 2,2-bis-(4-isocyanatocyclohexyl) which is a propane and 3-isocyanatomethyl-3,5,5-trimethylcyclohexylisocyanate, p-phenylenediisocyanate and p-cyclohexyldiisocyanate.

As polyols, the polyols obtained by reaction of polyfunctional alcohols with aliphatic diacids or cyclic ethers are used. The polyfunctional alcohols are for example 1,2-ethanediol (ethyleneglycol), 1,2-propanediol, 1,3-propanediol, 1,2-butanediol, 1,4-butanediol, 2,2-dimethyl-1,3-propanediol (neopentylglycol), 1,6-hexanediol, 2-methyl-2,4-pentanediol, 3-methyl-2,4-pentanediol, 2-ethyl-1,3-hexanediol, 2,2,4-trimethyl-1,3-pentanediol, diethyleneglycol, triethyleneglycol, polyethyleneglycols, dipropyleneglycol, tripropyleneglycol, polypropyleneglycols or 2,2-bis(hydroxymethyl)-1-propanol (trimethylolethane), 2,2-bis(-hydroxylmethyl)-1-butanol (trimethylolpropane), 1,2,4-butanetriol, 1,2,6-hexanetriol, 2,2-bis(hydroxy)-1,3-propanediol (pentaerythritol) and 1,2,3,4,5,6-hexanehexol (sorbitol) and cyclohexanedimethanol.

The aliphatic diacids are for example malonic acid, succinic acid, glutaric acid, adipic acid, suberic acid and sebacic acid.

The polymerization initiator can be selected from among the photoinitiators when the polymerization of the layer is carried out under ultraviolet radiation or under electron radiation. It can also be a radical derivative capable of forming free radicals for example, t-bu perbenzoate under the effect of a relatively low temperature, for example on the order of 60° C. Benzophenone, acetophenone or benzoin isobutylether may be used as the photoinitiator.

The adhesive layer can be formed in situ on one of the elements to be assembled. This adhesive layer can also be formed on a support to which it does not adhere strongly, in order to form a sheet which is detached from said casting support and which is inserted between the elements to be assembled.

When the layer is formed directly on one of the elements to be assembled, the other element is preferably joined before the complete polymerization of the polyurethane.

When the adhesive layer is used for the assembly of the plastic layer with non-lacerating and self-repairing properties mentioned above with a monolithic or laminated support, of glass or plastic, a sheet with two layers can preferably be manufactured in advance in the following manner.

The non-lacerating and self-repairing layer, which is preferably formed from a heat-hardenable polyurethane, is manufactured first of all and the second layer is formed on this first layer.

In this manner a heat-hardenable polyurethane layer can first of all be manufactured by pouring a mixture of the components on a casting support. After polymerization of the monomers and formation of a heat-hardenable layer with a thickness varying between 0.2 and 0.8 mm, the reaction composition capable of forming the adhesive layer is poured. The adhesive layer can have a thickness of between 0.01 and 1 mm dependent upon the desired application. The sheet is then detached from the support prior to the polymerization of the adhesive layer, in order to be joined to a glass or plastic substrate. The adhesion of the elements is carried out at the same time as the polymerization of the adhesive layer, by UV treatment or an equivalent, where the adhesive layer contains a UV-sensitive initiator, or by heat treatment limited to cases where the adhesive layer contains an initiator of the radical derivative type.

When the adhesive layer is used for the assembly of the two layer sheet described in European Patent Publication No. 0,133,090, the same method can be used, by first forming the two component layers of the sheet and then the adhesive layer.

In this manner, safety glasses can be manufactured, such as glass for automobiles, in particular windshields, glass for buildings, safety eyeglasses, etc.

In an alternative embodiment, the polymerization of the adhesive layer can be carried out before assembly with the other glazing elements, whilst it is, for example, still on the sheet-forming support. At that time, the sheet is treated in an appropriate manner, for example by passage under UV radiation.

The adhesion layer can be formed by pouring the mixture of the components onto a support or, as indicated above, onto one of the elements to be assembled or, as necessary, onto both elements. The pouring can be carried out by means of a pouring head, such as that described for example in French Patent Publication No. 2,347,170. In an alternative embodiment, the adhesive layer can be formed by pulverization of the mixture of components. For this purpose centrifugal pulverization, using a rotor rotating at a speed of between 1000 and 8000 rpm, can be used.

Depending on the role of the adhesive layer in the assembly, it is possible to modify its mechanical properties by means of the degree of polymerization of the polyurethane, that is, by working on the lengths of the chains of said polymer.

Thus, when the adhesive layer only has to act as an adhesive, it is not always necessary to carry out total polymerization of the polyurethane such as it could be theoretically when the starting composition contains a polymerization initiator. In this case, not all the double ethylene bonds of the polyurethane chains will be made to react.

However, in general, total or almost total polymerization will be carried out by UV treatment or the like or, as necessary, by heat treatment. This polymerization guarantees preservation of the adhesion over time.

If, in addition to an adhesive function, the adhesive layer must fulfill an energy absorption function, then a composition and a method of polymerization will be selected which, as necessary, can use heat, providing longer chains by grafting chains to one another at the double ethylene bonds. In this case, preferably, the starting composition will comprise, in addition to the components already mentioned, acrylic derivatives selected, for example, from among hydroxyethyl acrylate, trimethylolpropanatriacrylate, trimethylolpropane-trimethacrylate, ethyl-2-hexyl acrylate, butyl and methyl acrylates.

The adhesive layer in accordance with the invention can be used for the manufacture of stratified glass or plastics, such as polycarbonate, polyamides, acrylics or polyurethanes.

For example, the adhesive layer in accordance with the invention is used for the manufacture of a laminated glass formed of two sheets of glass and an interpolated sheet with energy absorption properties, the adhesion of which to the two sheets of glass is provided on each side by an adhesive layer in accordance with the invention. The interpolated sheet with the energy absorption properties can then be of polyvinylbutyral, polyvinyl chloride, polyurethane, etc., and it need not, moreover, have specific adhesive properties as is the case in a conventional laminated glass formed solely from two sheets of glass and the interpolated layer.

The adhesive layer can also be used to directly bond the two sheets of glass of a laminated glass. At a thickness of approximately 0.4 mm and greater, it can act as an energy absorber.

The adhesive layer in accordance with the invention can further be used for the manufacture of a safety glass comprising a sheet of glass, a layer of plastic with energy absorbing properties (EA layer), a non-lacerating and self-repairing layer, with the adhesive layer providing bonding of the glass sheet with the EA layer.

The adhesive layer in accordance with the invention can further be used for the manufacture of a safety glass formed by a monolithic or laminated glass or plastic support onto which, by mean of the adhesive layer, a non-lacerating and self-repairing layer, as described above, is adhered.

The adhesive layer in accordance with the invention can further be used for the assembly of a sheet of glass with a sheet of polycarbonate or for the assembly of other plastic layers.

Other advantages and characteristics of the invention will become apparent from the following description of examples of embodiments and applications of the adhesive layer in accordance with the invention.

EXAMPLE 1

A polyurethane was prepared by mixing 175 g (0.175 mole) of a polyether with a molecular weight of 1000, for example the product commercially available under the name POLYMEG 1000, 28.4 g (0.275 mole) of 1,4-butanediol, and 20.9 g (0.042 mole) of a polyesterpolyol with a molecular weight of 1140 and a functionality of between 2.2 and 2.4. To this was added 125.1 g (0.45 mole) of isophorone diisocyanate comprising 10% by weight of urea functions and 20.1 g (0.1 mole) of m.TMI in the presence of 0.02% by weight of dibutyltin dilaurate in relation to the weight of the polyurethane and of 3% by weight of acetophenone in relation to the weight of the compound with ethylene bonds. This was reacted at 120° C. for 2 hours.

The reaction product was diluted with acrylic acid in order to be poured onto a sheet of glass and form a homogeneous, colorless layer. A second sheet of glass was placed onto the layer thus formed and the assembly was subjected to a sufficiently powerful electronic radiation to activate at least a part of the double bonds and increase the polymerization of the polyurethane. The laminated glass obtained had a good optical quality and good adhesion between the components. These properties lasted over time.

EXAMPLE 2

A polyurethane was prepared by mixing 201 g (1 mle) of m.TMI, 325 g (0.5 mole) of a polyetherdiol with a molecular weight of 650, 0.02% in relation to the weight of the two preceding components of dibutyltin dilaurate as a catalyst, 2.25% by weight in relation to the weight of the components of an ethylene bond of acetophenone as a photoinitiator and 40 parts of trimethylolpropane trimethylacrylate for 100 parts of the other polyurethane components.

This was heated at 80° C. for 2 hours. The reaction product was a monourethane. This product was diluted acrylic acid and was spread onto a sheet of glass to form a layer with a homogeneous thickness. A second sheet of glass was placed on this layer and the assembly was subjected to UV irradiation treatment.

EXAMPLE 3

A polyurethane was prepared by mixing 201 g (1 mle) of m.TMI with 180 g (0.33 mole) of a polycaprolactonetriol with a molecular weight of 540, in the presence of 0.02% by weight of dibutyltin dilaurate as a catalyst and 2.5% by weight of acetophenone in relation to the weight of the components with an ethylene bond. After treatment for 2 hours at 80° C., 20 parts of trimethylolpropane triacrylate for 100 parts of the above reaction product were added. The composition was spread onto a sheet of glass to form a homogeneous layer which was covered with a second sheet of glass. The assembly was then subjected to UV irradiation treatment.

EXAMPLE 4

21.9 g (0.141 mole) of isocyanatoethylmethacrylate (IEM) were mixed with 26.14 g (0.0261 mole) of a polyetherdiol with a molecular weight of 1000, and 4 g (0.044 mole) of 1,4-butanediol in the presence of 0.02% by weight of dibutyltin dilaurate as a catalyst. This was reacted for 2 hours at 80° C. and diluted with acrylic acid. The mixture was poured onto a glass sheet so as to form a homogeneous layer which was covered with a second sheet of glass. This was allowed to polymerize for 7 hours at 50° C. and then for one night at room temperature.

EXAMPLE 5

125.1 g (0.45 mole) of isophoronediisocyanate (IPDI) comprising approximately 10% by weight of urea functions was mixed with 166.5 g (0.166 mole) of a polyetherdiol with a molecular weight of 100, 25.5 g (0.28 mole) of 1,4-butanediol, 111 g (0.1 mole) of IEM, 18.5 g (0.018 mole) of a polyetherdiol with a molecular weight of 1000, and 2.83 (0.031 mole) of 1,4-butanediol in the presence of 0.02% by weight of dibutyltin dilaurate. This was heated for 2 hours at 80° C. Then 20 parts of trimethylolpropane trimethacrylate was added for 100 parts of the above reaction product. The mixture was poured onto a sheet of glass so as to form a layer with a homogeneous thickness which was covered with a second sheet of glass. The assembly was subjected to UV irradiation treatment.

EXAMPLE 6

The composition described in Example 1 for forming the polyurethane was poured onto a plastic sheet formed of a layer of thermoplastic polyurethane with energy absorbing properties and a heat-hardenable polyurethane laye with self-repairing properties, for example the sheet described in European Patent Publication No. 0,133,090. After formation of the adhesive layer, the three-layer sheet was bonded at room temperature to a sheet of glass and the assembly was subjected to UV treatment through the plastic sheet. The glass obtained had good optical quality and good adhesion between its elements.

EXAMPLE 7

The composition described in Example 5 was poured onto the plastic sheet described in European Patent Publication No. 0,133,090. The three-layer sheet obtained was bonded at room temperature to a sheet of glass and the assembly was subjected to UV treatment.

EXAMPLE 8

The composition described in Example 1 was pulverized onto a plastic sheet formed of a layer of heat-hardenable polyurethane with self-repairing and non-lacerating properties. After formation of the adhesive layer, the two-layer sheet was bonded at room temperature to a laminated glass formed of two sheets of glass and an interpolated layer of polyvinylbutyral. The assembly was subjected to UV treatment through the plastic sheet.

EXAMPLE 9

The same method was carried out as in Example 8 using the composition described in Example 5.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An adhesive layer used in the manufacture of laminated glazings of glass and/or plastic, comprising a polyurethane formed from a composition comprising an isocyanate component comprising at least one monoisocyanate with a double ethylene bond in its formula, a polyol component comprising at least one polyol selected from the group consisting of the polyetherpolyols or polyesterpolyols with a molecular weight of between 450 and 2000, polycaprolactones with a molecular weight of between 500 and 2000, polycarbonatepolyols and polyesterpolycarbonatepolyols with a molecular weight of between 1000 and 2000, and polybutadienes with a hydroxyl or carboxyl function, at least one short diol with a molecular weight of between 50 and 200, at least one reticulating agent with a functionality greater than 2 and at least one polymerization initiator.

2. The adhesive layer of claim 1, wherein said reticulating agent is a triol of molecular weight between 100 and 3000.

3. The adhesive layer in accordance with claim 1, wherein the monoisocyanate with a double ethylene bond is selected from among α,α-metisopropenyl dimethylbenzylisocyanate and isocyanatoethylmethacrylate.

4. The adhesive layer in accordance with claim 1, wherein the isocyanate component also comprises at least one aliphatic or cycloaliphatic diisocyanate.

5. The adhesive layer in accordance with claim 1, wherein the polymerization initiator is a photoinitiator.

6. The adhesive layer in accordance with claim 1, wherein the composition contains at least one acrylic derivative in addition to the monoisocyanate with a double ethylene bond.

7. A laminated glass comprising at least one adhesive layer in accordance with claim 1.

8. The laminated glass in accordance with claim 7, characterized in that it comprises a monolithic or laminated support and a non-lacerating and self-repairing layer adhered to the support by means of the adhesive layer.

9. The laminated glass in accordance with claim 7, characterized in that it comprises a monolithic or laminated support and a two-layer sheet of polyurethane, comprised of a non-lacerating and self-repairing layer and a layer with energy absorbing properties, adhered to the support by means of the adhesive layer.

* * * * *